United States Patent [19]

Lockwood et al.

[11] 4,135,633
[45] Jan. 23, 1979

[54] ELECTRICAL JUNCTION AND OUTLET BOX

[75] Inventors: Alan C. Lockwood, Rosemead; Glenn A. Stock, Alhambra, both of Calif.

[73] Assignee: Norris Industries, Inc., Los Angeles, Calif.

[21] Appl. No.: 846,676

[22] Filed: Oct. 31, 1977

[51] Int. Cl.² ............................................. H02G 3/08
[52] U.S. Cl. ........................................ 220/3.94; 220/62
[58] Field of Search ................. 220/3.92, 3.94, 3.8, 220/4 R, 62, DIG. 29; 228/173 A, 173 C, 174, 178; 174/53

[56] References Cited

U.S. PATENT DOCUMENTS

| | | | |
|---|---|---|---|
| 782,417 | 2/1905 | Robb | 220/3.94 |
| 928,251 | 7/1909 | Dorff | 220/3.94 |
| 1,420,694 | 6/1922 | Gore | 220/3.94 |
| 1,447,600 | 3/1923 | Olevin | 220/3.92 |
| 1,501,250 | 7/1924 | Tefft | 220/3.94 |
| 1,637,750 | 8/1927 | Kilham | 228/178 |
| 1,857,787 | 5/1932 | Meeks et al. | 220/3.92 |
| 1,922,432 | 8/1933 | Gould | 220/3.94 |
| 2,544,232 | 3/1951 | Kennedy | 220/3.94 |
| 2,625,288 | 1/1953 | Clark et al. | 220/3.94 |
| 2,883,228 | 4/1959 | Roberts, Jr. | 220/3.8 |

Primary Examiner—Stephen P. Garbe
Assistant Examiner—Allan N. Shoap
Attorney, Agent, or Firm—Edward A. Sokolski

[57] ABSTRACT

An electrical junction and outlet box is formed from a side wall fabricated from an elongated flat strip bent into a desired geometric shape, with its ends joined together by means of a dovetail joint which is appropriately staked to make for a tight joint. A bottom for the box is formed by a flat plate shaped in the same geometric shape as the side wall. The side wall and bottom plate have alternate lip and indented portions formed around their edges, the lip portions of each of these members fitting within the indented portions of the other. The bottom plate has projections formed along the edges of the inner surfaces of the indented portions thereof which facilitate the location of the bottom plate against the bottom edge of the side wall immediately prior to welding. Mating projections on the side wall and the bottom plate appear opposite each other to form weld points for joining the side wall and the bottom plate together. The box further has a pair of ears with apertures formed therein for receiving mounting screws, these apertures being dished at their entrances to facilitate the reception of the screws therein.

5 Claims, 9 Drawing Figures

ELECTRICAL JUNCTION AND OUTLET BOX

This application relates to electrical junction and outlet boxes, and more particularly to such a box having a side wall formed from a strip of material bent to a desired configuration and joined together at its opposite ends, and a bottom plate which is welded to an edge of the side wall.

Many electrical junction and outlet boxes presently in use are fabricated from a single sheet of metal which is drawn and shaped to the desired configuration. Attempts to introduce junction boxes fabricated from pieces which are joined together by welding and the like have been resisted in view of the feeling that they would not have the structural integrity of the one-piece units. Thus, boxes drawn from a single sheet of metal have found favor in the industry despite the fact that they are much more expensive to fabricate than boxes formed from separate side and bottom portions which are joined together by suitable means such as welding.

Electrical junction and outlet boxes fabricated of separate side wall and bottom portions are described in U.S. Pat. Nos. 2,544,232 and 2,544,266 to Kennedy, and U.S. Pat. No. 2,625,288 to E. B. Clark et al. These prior art boxes have side wall portions which are joined together at their opposite ends by means of dovetail joints. The bottoms of these boxes are then joined to the sides by both mechanical means and welding.

The device of the present invention is a junction and outlet box fabricated from separate side and bottom portions which provides substantial improvement over the aforementioned prior art boxes. The box of the present invention has high structural integrity comparable to that of boxes drawn from a single sheet, and yet is significantly more economical and easier to fabricate. Further, the box of the present invention can be fabricated with automatic machinery which forms both the side wall and the bottom plate and assembles them together to form an integral unit. It is to be noted in this regard that in order to achieve a good weld joint in electric welding, it is necessary that good contact be made between the members at the weld points. The present invention assures this end result by means of locators which are effective in consistently facilitating the placement of the bottom plate against the side wall with mating weld point projections on each of these pieces in abutment with each other immediately prior to and during welding. Further, a uniformly tight joint is formed between the opposite ends of the side wall by employing interlocking dovetails which are interference fitted, staked as may be necessary and welded together. Another feature of the present invention is the use of apertured ears for receiving the mounting screws which have dished aperture entrances so as to facilitate the finding of these holes, particularly in situations where they are somewhat hidden, as in the case where the box is utilized for an overhead light fixture where a deep canopy may be employed which necessitates using long screws which must be inserted into the tapped apertures of the mounting ears.

It is therefore an object of this invention to provide an electrical junction box fabricated from separate side wall and bottom plate pieces which has improved structural integrity as compared with prior art boxes of this type.

It is a further object of this invention to provide a junction box of high structural integrity which is more economical to fabricate than many prior art boxes.

Other objects of this invention will become apparent as the description proceeds in conjunction with the accompanying drawings, of which:

Briefly described, my invention is as follows: A side wall for the box is formed from an elongated flat strip bent into the desired geometric shape. The opposite ends of this strip are joined together by means of a dovetail joint which may be staked and welded to form a tight joint. A bottom for the box is formed by a flat plate having substantially the same geometric shape as the side wall portions. Alternate lip and indented portions are provided along the edges of the side wall and the bottom plate, the lip portions of the side walls fitting within the indented portions of the bottom plate and vice-versa. Locator projections are formed at predetermined points along the indented edge portions of the bottom plate, these locator projections serving to facilitate the location of the bottom plate against the side wall immediately prior to and during welding. Also, mating projections are formed along opposing edges of the side plate indented portions and bottom plate lip portions to provide weld points for joining the side wall and bottom plate together. The box further includes a pair of apertured ears for receiving mounting screws used to retain electrical devices thereto, these apertures being dished at their entrances to facilitate the reception of the screws.

Figure 1:
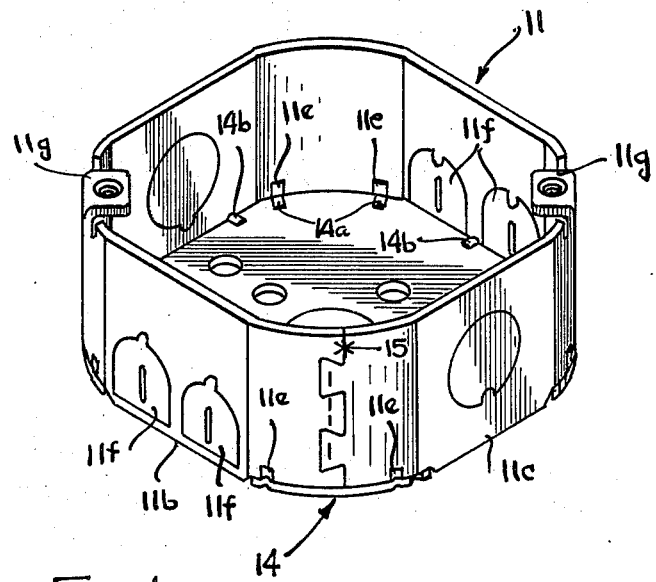
FIG. 1 is a perspective view of a preferred embodiment of the invention.
Figure 7:
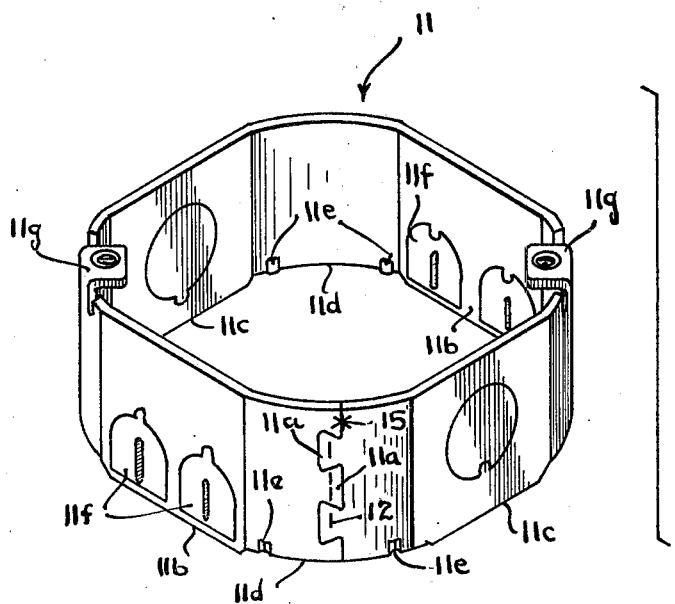
FIG. 7 is an enlarged view illustrating the dished screw receiving aperture of the preferred embodiment.
Figure 2:
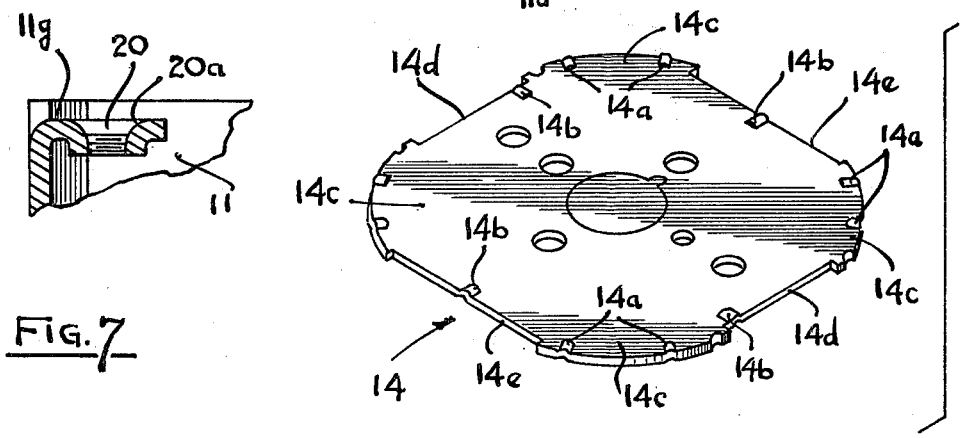
FIG. 2 is an exploded view showing the assembly of the preferred embodiment.

Referring to the Figures, a preferred embodiment of the invention is illustrated. Side wall 11 is formed from a flat strip of material which may be a suitable metal, this strip being bent to the desired configuration by means of a bending press. The end portions 11a of the strip are dovetailed so that they can be interlocked together, a tight joint being formed between the dovetailed end portions by virtue of an interference fit and staking as indicated by punching the metal to spread portion 11a by dotted line 12, so as to form a tight joint. In addition, a spot weld may be made at point 15. Side wall 11 has a first pair of oppositely positioned lip portions 11b and a second pair of oppositely positioned lip portions 11c formed along the bottom edge thereof. The lip portions are coplanar with the side wall portions in which they are formed, and elongated and narrow relative to the height of the side wall, the edges of the lip portions being uniplanar. Lip portions 11b and 11c are separated from each other by indented portions 11d which have substantially uniplanar edges lying in a plane parallel to the plane of the lip portion edges. It is to be noted that lip portions 11b are substantially longer than lip portions 11c. Formed along the edges of indented portions 11d are pairs of indentations 11e. A plurality of knockout panels 11f are formed in side wall 11, these knockout portions extending to the inner surface of the bottom plate 14 so as to avoid the formation of sharp bottom edges along these apertures which might damage a cable fitted therethrough. A pair of ears 11g extend inwardly from opposite portions of the top edges of the side wall. As can be seen more readily in FIG. 7, these ears have apertures 20 formed therethrough, the entrances 20a to these apertures being dished to facilitate the locating of mounting screws therein.

Figure 3:
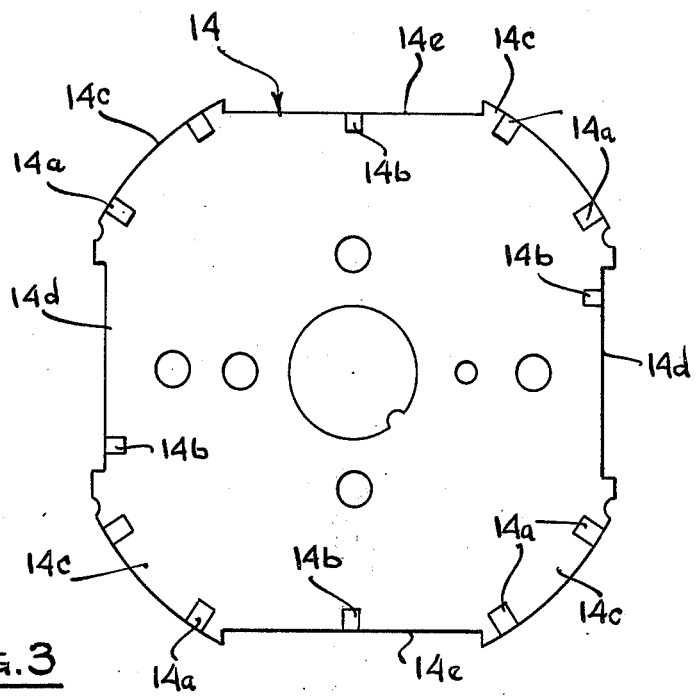
FIG. 3 is a top plan view of the bottom plate of the preferred embodiment.
Figure 4:
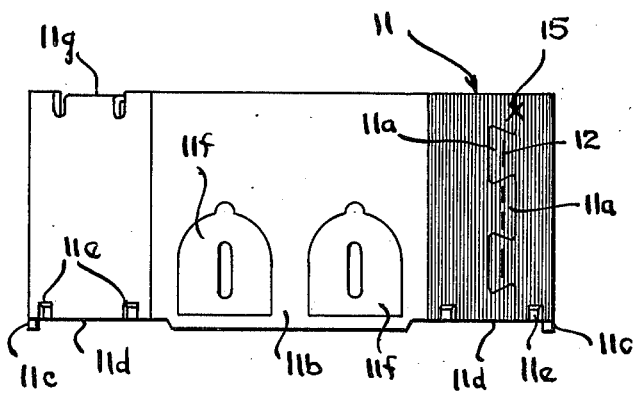
FIG. 4 is a side elevational view of the side wall of the preferred embodiment.

Referring now particularly to FIG. 3, bottom plate 14 is substantially flat and has a shape which corresponds to that of side wall 11. Formed around the edge of plate 14 are a plurality of lip portions 14c which are lying in the same plane as the remainder of the plate, which are narrow relative to the overall width of the plate and separated from each other by paired opposite indentations 14d which have a first length, and paired opposite indentations 14e which are of a second length. Formed on each of lip portions 14c are a pair of inward projections 14a, which as to be explained further on in the specification establish projection weld points. Formed along each of the indentations 14d and 14e is an inward projection 14b which, as also to be later explained, is used for properly locating the bottom plate within the side wall immediately prior to and during welding. The details of these projections can be better seen in FIGS. 5A, 5B, 6A and 6B.

Figure 5A:
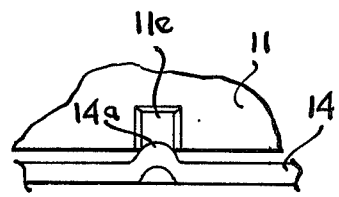
FIG. 5A is an enlarged view illustrating the welding point projections employed in the preferred embodiment prior to welding.
Figure 5B:
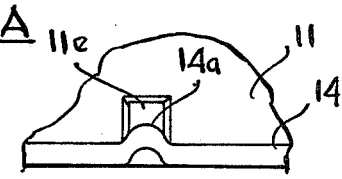
FIG. 5B is an enlarged view illustrating the welding point projections subsequent to welding.
Figure 6A:
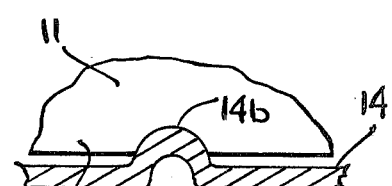
FIG. 6A is an enlarged cross-sectional view illustrating a locator projection formed in the bottom plate of the preferred embodiment prior to welding.
Figure 6B:
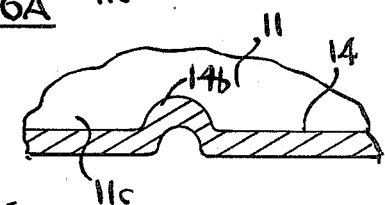
FIG. 6B is an enlarged cross-sectional view illustrating a locator projection subsequent to welding.

Referring now particularly to FIGS. 1, 2, 5A, 5B, 6A and 6B, the bottom plate and side wall are joined together as follows: Plate 14 is first placed in proper position along the bottom edge of side wall 11 with the wider lips 11b of the side wall placed opposite the wider indentations 14e of the plate, and the narrower lips 11c placed opposite narrower plate indentations 14d. It is to be noted that prior to welding, as can be seen in FIGS. 5A and 6A, the weld projections 14a are higher than after welding, such that the lip portions of the side wall are not inserted in their mating indentations in the bottom plate and the lip portions of the bottom plate are not inserted in their mating indentations in the side wall. The mating lip and indented portions thus cannot serve to locate the bottom plate against the side wall immediately prior to and during welding. Plate 14 is accurately located in position prior to and during welding by means of locator projections 14b on the plate which extend past the edges of each of lips 11b and 11c as shown in FIG. 6A. The edges of the mating lip portions of the bottom plate and side wall along with the main body of the bottom plate form a substantially uniplanar bottom for the box, the edges of which are contiguous with the side wall.

With plate 14 properly installed against side wall 11, welding projections 14a of the plate are in abutment with the welding indentations 11e of the side wall. Locator projections, as already noted, locate the bottom plate in position for welding to the side wall. Good contact is thus established between these welding projections such that a good projection weld joint can be made at each of these points. When the welding has been completed, the heights of weld projections 14a are reduced as shown in FIG. 5B so that lip portions 11b and 11c are brought down into the associated indentations 14e and 14d and lip portions 14c are inserted in associated indentations 11d, as can be seen from FIG. 6B.

All of the above operations and the formation of the side wall can be accomplished with automated machinery, such that highly efficient mass production of the box is achieved. The box of the present invention is one of high structural integrity which is substantially more economical to fabricate than prior art drawn boxes, has improved structural characteristics and is easier to fabricate than prior art boxes formed from two or more pieces.

While the invention has been described and illustrated in detail, it is to be clearly understood that this is by way of illustration and example only and is not to be taken by way of limitation, the spirit and scope of this invention being limited only by the terms of the following claims.

I claim:

1. An electrical junction and outlet box comprising:

a side wall formed from an elongated flat strip bent into a predetermined geometric shape, the opposite ends of said side wall being joined together, said side wall having a plurality of lip portions formed along the bottom edge thereof, said lip portions being co-planar with the side wall portions in which they are formed and elongated and narrow relative to the height of said side wall, said lip portions further having longitudinal substantially uniplanar edges and being spaced around said bottom edge and separated from each other by indented portions having substantially uniplanar edges lying in a plane parallel to the plane of the lip portion edges, and a flat bottom plate welded to said side wall and having substantially the same geometric shape as said side wall, said bottom plate having a plurality of lip portions which are narrow relative to the width of said bottom plate and which lie in the same plane as the remainder of said bottom plate, said bottom plate lip portions being separated from each other by indented portions formed along the edge thereof, the lip portions of said bottom plate being fitted within the indented portions of said side wall and the lip portions of said side wall being fitted within the indented portions of said bottom plate to form a substantially uniplanar bottom for said box, the edges of which are contiguous with said side wall, upward projections being formed on the lip portions of said bottom plate and indentations being formed on the indented portions of said side wall, each projection of said bottom plate being positioned opposite a corresponding indentation on said side wall, a weld joint being made between the bottom plate and the side wall at each of said pairs of corresponding projections and indentations, said bottom plate having locator projections along the edges of the inner surfaces of the indented portions thereof, the edges of said locator projections abutting against the sides of the lip portions of said side wall and thereby facilitating the location of said bottom plate against the bottom edge of said side wall with said corresponding projections and indentations in abutment against each other during welding.

2. The junction and outlet box of claim 1 wherein a first mating pair of indented portions of said side wall and lip portions of said plate have a first length and a second mating pair of indented portions of said side wall and lip portions of said plate have a second length.

3. The junction and outlet box of claim 1 wherein the opposite ends of said side wall have dovetailed configurations which are interleaved to form a joint, said ends being staked by punching so as to spread said ends to form a tight joint between said ends.

4. The junction and outlet box of claim 1 and further including a pair of ears extending inwardly towards each other from opposite top edges of said side wall, said ears each having a threaded aperture formed therethrough, the top edges of said apertures being dished to facilitate the entrance of a screw.

5. The junction and outlet box of claim 1 and further including at least one knockout panel formed in said side wall, said knockout panel extending to the inner surface of said bottom plate.

* * * * *